United States Patent
Kim (10) Patent No.: US 8,773,546 B2
(45) Date of Patent: Jul. 8, 2014

(54) PHOTOGRAPHING CONTROL METHOD AND APPARATUS FOR CAPTURING IMAGE DATA AT A MOMENT IN TIME WHEN BOOTING

(75) Inventor: Sung-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 12/635,809

(22) Filed: Dec. 11, 2009

(65) Prior Publication Data

US 2010/0149370 A1 Jun. 17, 2010

(30) Foreign Application Priority Data

Dec. 16, 2008 (KR) .................. 10-2008-0128190

(51) Int. Cl.
*H04N 5/228* (2006.01)

(52) U.S. Cl.
USPC ...................................... 348/222.1

(58) Field of Classification Search
USPC .............. 348/372, 222.1, 207.99, 333.13
See application file for complete search history.

(56) References Cited

U.S. PATENT DOCUMENTS

| | | | | |
|---|---|---|---|---|
| 5,648,814 A | * | 7/1997 | Munson | 348/14.1 |
| 6,621,519 B2 | * | 9/2003 | Nakayama et al. | 348/223.1 |
| 7,212,235 B2 | * | 5/2007 | Nakayama et al. | 348/223.1 |
| 7,295,818 B2 | * | 11/2007 | Nagatomo | 455/127.1 |
| 7,471,334 B1 | * | 12/2008 | Stenger | 348/373 |
| 7,489,360 B2 | * | 2/2009 | Miyata | 348/372 |
| 7,519,289 B2 | * | 4/2009 | Sakurai | 396/303 |
| 7,598,995 B2 | * | 10/2009 | Yamaya | 348/333.02 |
| 7,932,929 B2 | * | 4/2011 | Wang | 348/222.1 |
| 7,995,111 B2 | * | 8/2011 | Nakayama et al. | 348/223.1 |
| 8,040,423 B2 | * | 10/2011 | Sato | 348/335 |
| 2002/0027601 A1 | * | 3/2002 | Nakayama et al. | 348/223 |
| 2004/0201772 A1 | * | 10/2004 | Kobayashi | 348/372 |
| 2005/0026575 A1 | * | 2/2005 | Nagatomo | 455/127.1 |
| 2005/0168611 A1 | * | 8/2005 | Yamaya | 348/333.01 |
| 2006/0028579 A1 | * | 2/2006 | Sato | 348/362 |
| 2006/0285843 A1 | * | 12/2006 | Sakurai | 396/303 |
| 2007/0146499 A1 | * | 6/2007 | Nakayama et al. | 348/223.1 |
| 2008/0231724 A1 | * | 9/2008 | Wang | 348/222.1 |
| 2010/0245605 A1 | * | 9/2010 | Sakurai | 348/208.99 |

* cited by examiner

*Primary Examiner* — Nicholas Giles (74) *Attorney, Agent, or Firm* — Drinker Biddle & Reath LLP (57) ABSTRACT

Provided are a photographing control method and apparatus for capturing image data at a moment in time when booting. According to the photographing control method, booting and photographing are simultaneously performed by combining use of a power supply button and a certain key button or by pressing a certain key button for a predetermined time without pressing a power supply button.

7 Claims, 6 Drawing Sheets

PHOTOGRAPHING CONTROL METHOD AND APPARATUS FOR CAPTURING IMAGE DATA AT A MOMENT IN TIME WHEN BOOTING

CROSS-REFERENCE TO RELATED PATENT APPLICATION

This application claims the benefit of Korean Patent Application No. 10-2008-0128190, filed on Dec. 16, 2008, in the Korean Intellectual Property Office, the disclosure of which is incorporated herein in its entirety by reference.

BACKGROUND

The present invention relates to a photographing control method and apparatus, and more particularly, to a photographing control method and apparatus for capturing image data at a moment in time when booting.

In order to capture a moving image by using a conventional digital camera, the conventional digital camera is first turned on, and is used after boot-up or booting is completed.

Here, a booting time takes about less than 1 second to several seconds but may differ according to the performance of the conventional digital camera. Accordingly, after booting is completed, an image is captured after adjusting the composition of a subject and the focus, and thus, the conventional digital camera is able to capture a moving image.

However, when a user wishes to quickly take a picture of an object that is passing by but a digital camera is turned off, the object is able to be photographed after the user presses a power supply button of the digital camera and waits for the digital camera to boot. In this case, even when the digital camera is booted in a very short time, for example, in 0.5 seconds, it may not be possible to capture the moment.

For example, even when the user wishes to photograph an object that passes in the sky or a moment that quickly occurs, i.e., even when the user has a moment that needs to be captured quickly, the standby time for taking a picture increases when the digital camera is turned off, and thus, it is difficult to capture the moment.

SUMMARY

Various embodiments of the present invention provide a photographing control method and apparatus for capturing a moment, which simultaneously perform booting and capturing by combining use of a power supply button and a certain key button, since a standby time is generated when a user turns on a camera that was turned off, waits for the camera to boot, and then, captures an image or a moving image so as to capture an image or a moving image at a certain moment.

The embodiments also provide a photographing control method and apparatus for capturing a moment, which simultaneously perform booting and capturing when a user presses a certain key button for a predetermined time, without pressing a power supply button.

The embodiments also provides a computer readable recording medium having recorded thereon a program for executing the photographing control method.

According to an aspect of the present invention, there is provided a photographing control method for capturing a moment by using a certain key button of a digital photographing apparatus, the photographing control method including: detecting a power-on signal of the digital photographing apparatus and an input signal of the certain key button; when the input signal is detected, booting the digital photographing apparatus according to the power-on signal; preparing photographing corresponding to the certain key while booting the digital photographing apparatus; and controlling the digital photographing apparatus to photograph a predetermined subject.

In the preparing of photographing, the method may comprise setting a photographing mode of the digital photographing apparatus in an automatic mode.

The photographing control method may further include: photographing the predetermined subject in the automatic mode according to the controlling of the digital photographing apparatus; and controlling the digital photographing apparatus to convert to a mode before completion.

The photographing control method may further include controlling the digital photographing apparatus to set to a photographing setting value before completion.

The photographing corresponding to the certain key button may include capturing a static image or a moving image.

According to another aspect of the present invention, there is provided a photographing control method for capturing a moment using a certain key button of a digital photographing apparatus, the photographing control method including: detecting an input signal of the certain key button of the digital photographing apparatus; when the input signal is detected, determining whether the input signal is a long key input signal; when the input signal is a long key input signal, turning on and booting the digital photographing apparatus; preparing photographing corresponding to the certain key button while booting the digital photographing apparatus; and controlling the digital photographing apparatus to photograph a predetermined subject.

In the preparing of the photographing, a photographing mode of the digital photographing apparatus may be set to an automatic mode.

The photographing control method may further include: photographing the predetermined subject in the automatic mode according to the controlling of the digital photographing apparatus; and controlling the digital photographing apparatus to convert to a different mode before completion.

The photographing control method may further include controlling the digital photographing apparatus to set to a photographing setting value before completion.

The determining of whether the input signal is a long key input signal may determine whether the input signal continues for a predetermined time.

The photographing corresponding to the certain key button may include capturing a static image or a moving image.

According to another aspect of the present invention, there is provided a photographing control apparatus for capturing a moment using a certain key button of a digital photographing apparatus, the photographing control apparatus including a controller with a detector which detects a power-on signal of the digital photographing apparatus and an input signal of the certain key button, and algorithms that boot the digital photographing apparatus according to the power-on signal when the input signal is detected, prepare for photographing corresponding to the certain key button while booting the digital photographing apparatus, and control the digital photographing apparatus to photograph a predetermined subject.

The controller may set a photographing mode of the digital photographing apparatus to an automatic mode.

The photographing control apparatus may further include: a mode storage unit which stores a mode before completion of the digital photographing apparatus; and a setting value storage unit which stores a photographing setting value before completion of the digital photographing apparatus, wherein the controller controls the digital photographing apparatus to convert to the mode before completion stored in the mode storage unit after photographing the predetermined subject in the automatic mode, and sets the digital photographing apparatus to the photographing setting value stored in the setting value storage unit.

According to another aspect of the present invention, there is provided a photographing control apparatus for capturing a moment using a certain key button of a digital photographing apparatus, the photographing control apparatus including: a controller which detects an input signal of the certain key button of the digital photographing apparatus; and a long key recognizer which determines whether the input signal is a long key input signal when the input signal is detected, wherein when the input signal is a long key input signal, the controller turns on and boots the digital photographing apparatus, prepares for photographing corresponding to the certain key button while booting the digital photographing apparatus, and controls the digital photographing apparatus to photograph a predetermined subject.

The controller may set a photographing mode of the digital photographing apparatus in an automatic mode.

The photographing control apparatus may further include: a mode storage unit which stores a mode before completion of the digital photographing apparatus; and a setting value storage unit which stores a photographing setting value before completion of the digital photographing apparatus, wherein the controller controls the digital photographing apparatus to convert to the mode before completion stored in the mode storage unit after photographing the predetermined subject in the automatic mode, and sets the digital photographing apparatus in the photographing setting value stored in the setting value storage unit.

The long key recognizer may determine whether the input signal continues for a predetermined time.

The photographing corresponding to the certain key button may include capturing a static image or a moving image.

According to another aspect of the present invention, there is provided a computer readable recording medium having recorded thereon a program for executing the method of above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described more fully with reference to the accompanying drawings, in which exemplary embodiments of the invention are shown. Also, while describing the various embodiments of the present invention, detailed descriptions about related well-known functions or configurations that may diminish the clarity of the points of the present invention are omitted.

Unless defined otherwise, technical and scientific terms used herein have the same meaning as is commonly understood by one of ordinary skill in the art to which this invention belongs.

Figure 1:
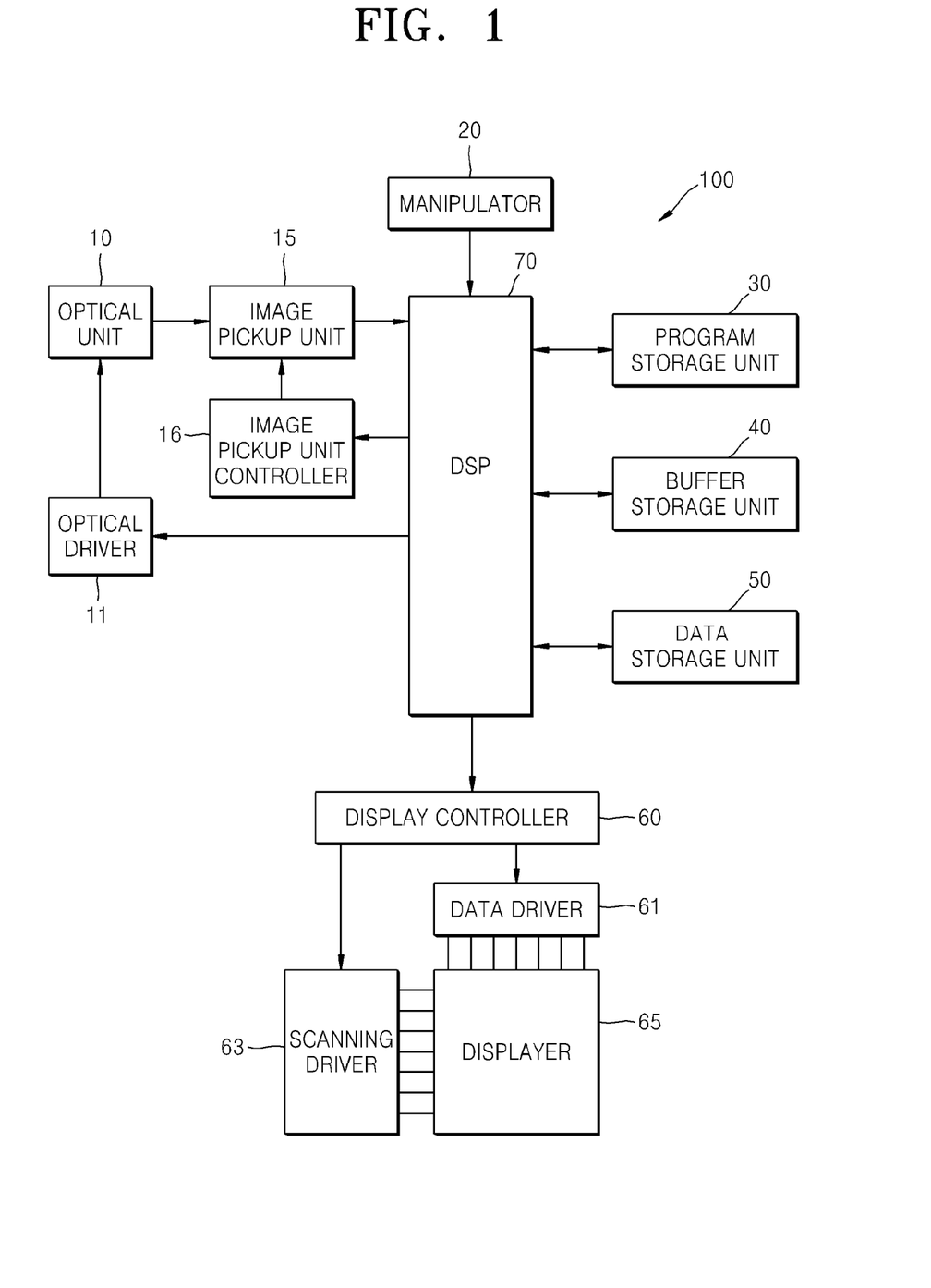
FIG. 1 is a block diagram schematically illustrating a digital photographing apparatus according to an embodiment of the present invention.

FIG. 1 is a block diagram schematically illustrating a digital photographing apparatus 100 according to an embodiment of the present invention.

Referring to FIG. 1, the digital photographing apparatus 100 includes an optical unit 10, an optical driver 11, an image pickup unit 15, an image pickup unit controller 16, a manipulator 20, a program storage unit 30, a buffer storage unit 40, a data storage unit 50, a display controller 60, a data driver 61, a scanning driver 63, a displayer 65, and a digital signal processor (DSP) 70.

The optical unit 10 receives an optical signal from a subject, and transmits the received optical signal to the image pickup unit 15. The optical unit 10 may include at least one lens such as a zoom lens, which narrows or widens a view angle according to a focal length, and a focus lens, which adjusts a focus of the subject. The optical unit 10 may further include an iris that adjusts light intensity.

The optical driver 11 adjusts a location of a lens and closes or opens an iris. The focus may be adjusted by moving a location of a lens. Also, the light intensity may be adjusted by opening or closing an iris. The optical driver 11 may control the optical unit 10 according to a control signal, which is automatically generated by an image signal received in real time or is manually input by manipulation of a user.

An optical signal that passed through the optical unit 10 forms an image of the subject on a light receiving surface of the image pickup unit 15. The image pickup unit 15 may use a charge coupled device (CCD) or a complementary metal oxide semiconductor image sensor (CIS), which convert an optical signal to an electric signal. Sensitivity or the like of the image pickup unit 15 may be adjusted by the image pickup unit controller 16. The image pickup unit controller 16 may control the image pickup unit 15 according to a control signal, which is automatically generated according to an image signal received in real time or is manually input by manipulation of the user.

The manipulator 20 may be used to receive a control signal from the outside, such as the user. The manipulator 20 includes a shutter-release button, which receives a shutter-release signal for capturing an image by exposing the image pickup unit to light for a predetermined time, a power supply button, which is pressed to supply power to the digital photographing apparatus 100, a wide angle-zoom button and a telescopic-zoom button, which widens or narrows a view angle according to an input, and various function buttons for selecting a mode, such as a character input mode, a photographing mode, or a reproducing mode, for selecting a white balance setting function, and for selecting an exposure setting function. According to an embodiment, a moment may be captured by pressing a certain function button of the manipulator 20. For example, when the digital photographing apparatus 100 is turned off, the subject may be immediately photographed while the digital photographing apparatus 100 is booted and prepared for photographing, by pressing the power supply button and one of a plurality of direction key buttons. Details thereof will be described below with reference to FIGS. 2 and 3.

As described above, the manipulator 20 may have a form including various buttons, but is not limited thereto. The manipulator 20 may have a form that receives an input of the user, such as a keyboard, a touch pad, a touch screen, or a remote controller.

The digital photographing apparatus 100 includes the program storage unit 30, which stores programs such as an operating system and an application system for operating the digital photographing apparatus 100, the buffer storage unit 40, which temporarily stores data required to operate the digital photographing apparatus 100 or result data, and the data storage unit 50, which stores various pieces of information required for a program and an image file including an image signal.

Moreover, the digital photographing apparatus 100 includes the display controller 60, which displays an operating status or information about an image captured by the digital photographing apparatus 100, the data driver 61 and the scanning driver 63, which transmit display data received from the display controller 60 to the displayer 65, and the displayer 65, which displays a predetermined image according to a signal received from the data driver 61 and the scanning driver 63. The displayer 65 may be a liquid crystal display panel (LCD), an organic light emitting display panel (OLED), or an electrophoresis display panel (EPD).

Also, the digital photographing apparatus 100 includes the DSP 70, which processes a received image signal and controls each element according to the image signal or an external input signal. The DSP 70 will be described below in detail with reference to FIG. 4.

Figure 2:
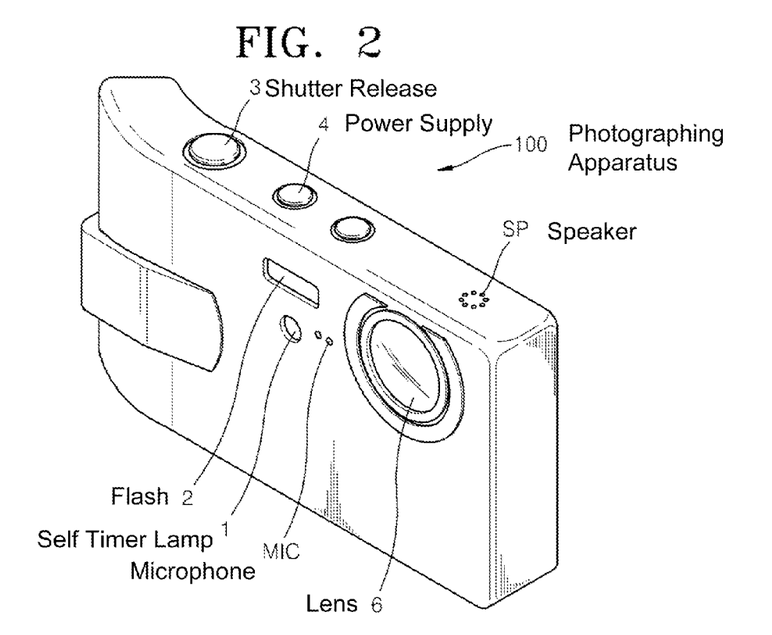
FIG. 2 is a perspective view illustrating a front and top external form of the digital photographing apparatus of FIG. 1.

FIG. 2 is a perspective view illustrating a front and top external form of the digital photographing apparatus 100 of FIG. 1.

Referring to FIG. 2, the digital photographing apparatus 100 that employs a photographing control apparatus according to an embodiment of the present invention includes a self-timer lamp 1, a flash 2, a shutter release button 3, a power supply button 4, a lens unit 6, a microphone MIC, and a speaker SP on the front and top.

In a self-timer mode, the self-timer lamp 1 operates during a set time from a point of time when the shutter release button 3 is pressed to a point of time when an image starts to be captured. The self-timer lamp generates auxiliary light according to the selection of a user.

The shutter release button 3 is formed of 2 stages. In other words, after the user manipulates the wide angle-zoom button and the telescopic-zoom button, when the user half-presses the shutter release button 3, an SH1 signal from the shutter release button 3 is turned on, and when the user fully presses the shutter release button 3, an SH2 signal from the shutter release button 3 is turned on. In a static image capturing mode and a moving image capturing mode, an image is captured after the SH2 signal is turned on. In a continuous photographing mode, an image is continuously captured while the SH1 signal is turned on.

When the user presses the power supply button 4, power is supplied to the digital photographing apparatus 100, and the digital photographing apparatus 100 is booted so as to operate a system of the digital photographing apparatus 100. A booting process is performed by operating the DSP 70 which controls the digital photographing apparatus 100, reading BIOS information and testing each element, wherein the reading and testing are performed by a controller that operates as a CPU in the DSP 70. For example, a system bus is tested, and a graphic test, a memory test, and an input interface test are performed. Time consumed to complete such a booting process is less than 1 second to several seconds based on the performance of the digital photographing apparatus 100.

Figure 3:
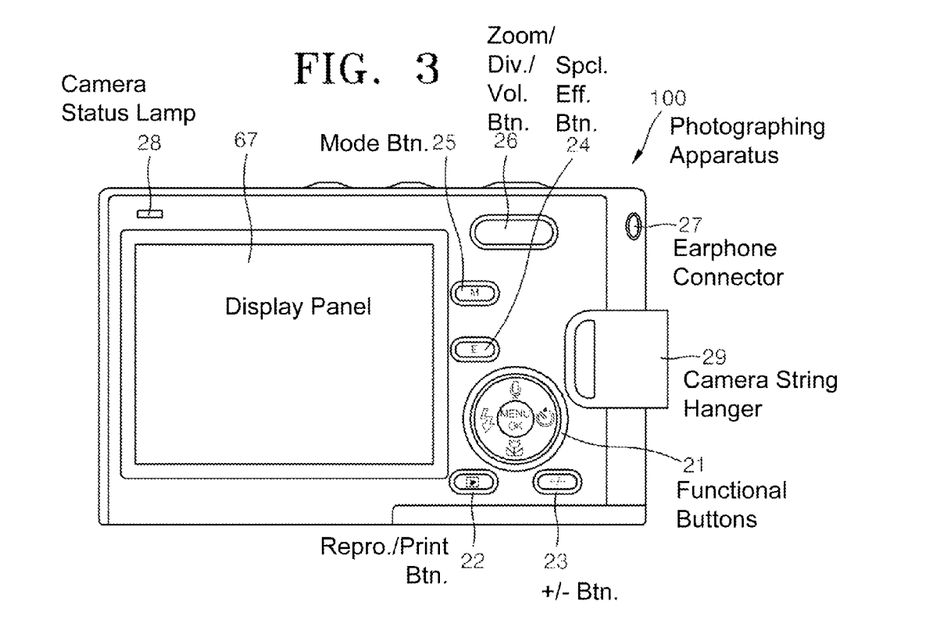
FIG. 3 is a perspective view illustrating a rear external form of the digital photographing apparatus of FIG. 1.

FIG. 3 is a perspective view illustrating a rear external form of the digital photographing apparatus 100 of FIG. 1. Functional buttons 21, a camera-status lamp 28, a special effect button 24, a camera string hanger 29, an earphone connector 27, a display panel 67, a +/−button 23, a zoom/9-division/volume button 26, a reproduction/printer button 22, and a mode button 25 are located at the back of the digital photographing apparatus 100.

The functional buttons 21 are used to perform certain functions of the digital photographing apparatus 100, to move an activation cursor on a menu screen of the display panel 67, and to convert a file or recording medium to be reproduced in a reproduction mode. According to an embodiment, the digital photographing apparatus 100 is booted and simultaneously captures a static image when the user presses a certain button, from among the functional buttons 21, with the power supply button 4 in order to capture a moment. Accordingly, when the booting is completed, a subject at a current composition is photographed by setting AF, AE, and photographing setting values, without specific manipulation of the user. Also, when the user presses a certain button, such as a down button, from among the functional buttons 21, with the power supply button 4, the digital photographing apparatus 100 is booted and simultaneously captures a moving image. In the current embodiment, an up button and the down button, from among the functional buttons 21, are used to capture a static image or a moving image; however the present invention is not limited thereto, and thus, other buttons illustrated in FIGS. 2 and 3 may be used to capture a static image or a moving image. Also in the current embodiment, the photographing for capturing a moment is performed by pressing a combination of the power supply button 4 and the certain button, but may be performed by pressing the certain button for a predetermined time, i.e., by pressing the certain button as a long key. For example, when a moment is to be captured while the digital photographing apparatus 100 is turned off, the up button is pressed for a predetermined time, i.e., for 2 to 3 seconds, the digital photographing apparatus 100 is turned on, booted, and automatically photographs a subject at the current composition when the booting is completed.

The camera-status lamp 28 is used to show various operational statuses of the digital photographing apparatus 100. The special effect button 24 is used to set special effects on an image to be captured.

The display panel 67 displays a preview image or a moving image to be captured, or a static image or a moving image to be reproduced. The display panel 67 may employ a touch screen method. The +/−button 23 is used to adjust a shutter speed for night view photographing.

The zoom/9-division/volume button 26 is used to perform a zooming operation in a photographing or reproduction mode, display nine pictures in the reproduction mode in one screen, or to adjust a volume of audio.

The reproduction/printer button 22 is used to mutually convert a reproduction mode and a preview mode, or directly output an image to a printer.

The mode button 25 is used to select a portable media player (PMP) mode or various photographing modes.

Figure 4:
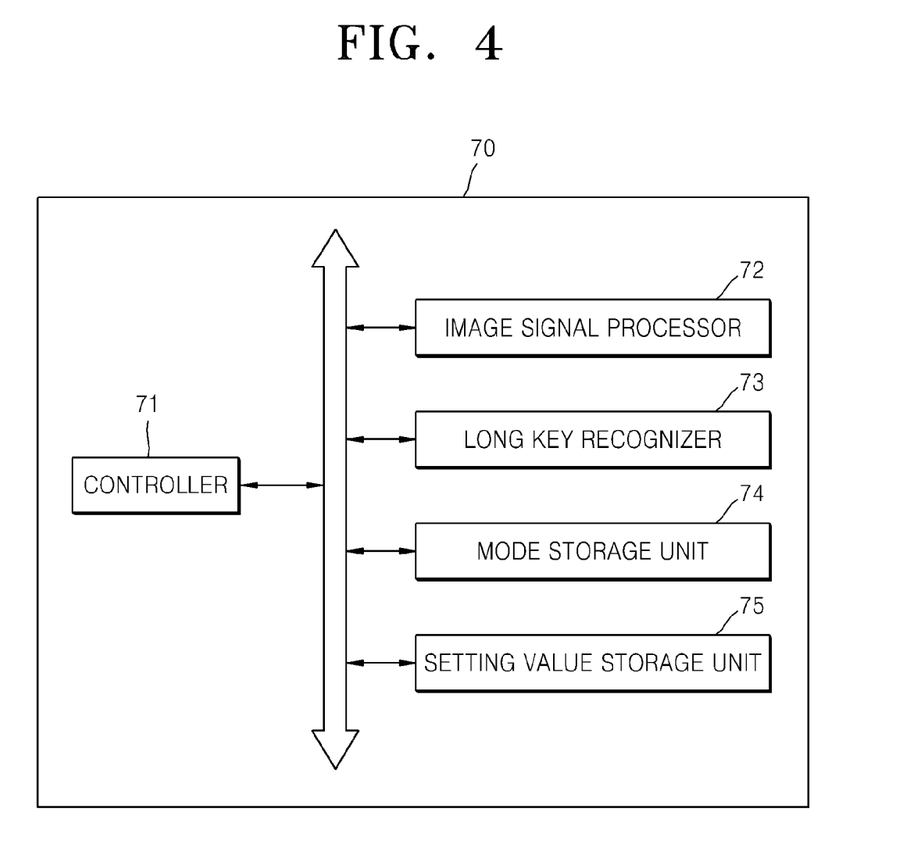
FIG. 4 is a block diagram schematically illustrating a digital signal processor illustrated in FIG. 1.

FIG. 4 is a block diagram schematically illustrating the DSP 70 illustrated in FIG. 1.

Referring to FIG. 4, the DSP 70 includes a controller 71, an image signal processor 72, a long key recognizer 73, a mode storage unit 74, and a setting value storage unit 75. The DSP 70 may be described as a photographing control apparatus herein.

The controller 71 controls overall operations of the DSP 70. Also, when power is supplied to the digital photographing apparatus 100 as the user presses the power supply button 4, the controller 71 performs a booting operation.

The image signal processor 72 converts an image signal received from the image pickup unit 15 to a digital signal, and processes the image signal, such as gamma correction, color filter array interpolation, color matrix, color correction, color enhancement, or the like, so that the image signal is suitable for the viewpoint of a person. When the image signal processor 72 is to process the image signal, an auto white balance or auto exposure algorithm may be performed. Also, the size of image data is adjusted by using a scaler, and an image file having a predetermined form by compressing the image data is formed. Alternatively, an image file may be decompressed. The image signal processor 72 may process image signals that are received via an image signal and a shutter release signal received in real time in a live-view mode before taking a photograph. Here, the image signals may be differently processed.

When the user presses the power supply button 4 of the digital photographing apparatus 100, the controller 71 comprises a detector that detects a power-on signal of the digital photographing apparatus 100, and determines whether a certain key button, for example, an up button of the functional buttons 21, is pressed with the power supply button 4. When the power-on signal and an input signal of the certain key button are detected, the controller 71 boots the digital photographing apparatus 100, and prepares for photographing corresponding to the certain key button. Here, static image capturing or moving image capturing are pre-determined according to a certain key button. After photographing is prepared, a subject at the current composition is photographed. Here, the preparing of the photographing includes setting a photographing mode of the digital photographing apparatus 100 in an automatic mode. When the photographing is completed, the controller 71 controls the digital photographing apparatus 100 to convert to a mode before photographing. For example, when the digital photographing apparatus 100 was in a reproduction mode, the digital photographing apparatus 100 is converted to the reproduction mode, and when the digital photographing apparatus 100 was in a nigh view mode from among photographing modes, the digital photographing apparatus 100 is converted to the night view mode. The controller 71 controls the digital photographing apparatus 100 to convert to a previous photographing setting value. In other words, the controller 71 controls the digital photographing apparatus 100 to maintain photographing setting values, such as a shutter speed, an iris value, and an exposure.

In general booting, a previous photographing mode and setting value are used in photographing, but such a method may cause a problem in a photographing control apparatus for capturing a moment according to an embodiment of the present invention, where an image is captured during booting. For example, when the digital photographing apparatus 100 previously captured an image in a night view mode and was then turned off, but a current moment is captured during the day, a satisfactory picture may not be taken. Accordingly, when digital photographing apparatus 100 captures an image during booting, the image is captured in an automatic mode regardless of a previous mode, and after the image is captured, the digital photographing apparatus 100 returns back to the previous mode. The same applies to a photographing setting value. When the booting and moving image capturing are simultaneously performed, the moving image is captured in a standard setting, and then the digital photographing apparatus 100 is returned back to a previous mode.

The long key recognizer 73 determines whether an input signal of the certain key button is a long key (or long duration) input signal. Specifically, whether the input signal is the long key input signal may be determined by determining whether the input signal is continued for, e.g., 3 seconds. A time for determining the long key input signal may be arbitrarily determined. Here, when the long key recognizer 73 determines that the input signal is a long key input signal, the controller 71 turns on and boots the digital photographing apparatus 100. During the booting, the controller 71 prepares for photographing corresponding to the certain key button, and controls the digital photographing apparatus 100 to photograph a predetermined subject. In detail, when the user sets an up button, from among the functional buttons 21, to have a static image capturing function, a down button, from among the functional buttons 21, to have a moving image capturing function, and recognize an input signal as a long key input signal when the same key is pressed for at least 3 seconds, the digital photographing apparatus 100 is turned on, booted, and captures a static image when the user presses the up button for more than 3 seconds so as to capture a moment. Also, when the user presses the down button for more than 3 seconds, the digital photographing apparatus 100 is turned on and simultaneously booted and captures a moving image.

The mode storage unit 74 stores a mode before completion of the digital photographing apparatus 100.

The setting value storage unit 75 stores a photographing setting value before completion of the digital photographing apparatus 100. Here, the mode storage unit 74 and the setting value storage unit 75 respectively store the mode before completion and the photographing setting value before completion, but such functions of the mode storage unit 74 and the setting value storage unit 75 may be performed by the buffer storage unit 40. After the subject is photographed in the automatic mode, the controller 71 controls the digital photographing apparatus 100 to convert to the mode before completion stored in the mode storage unit 74 and to the photographing setting value stored in the setting value storage unit 75.

Figure 5:
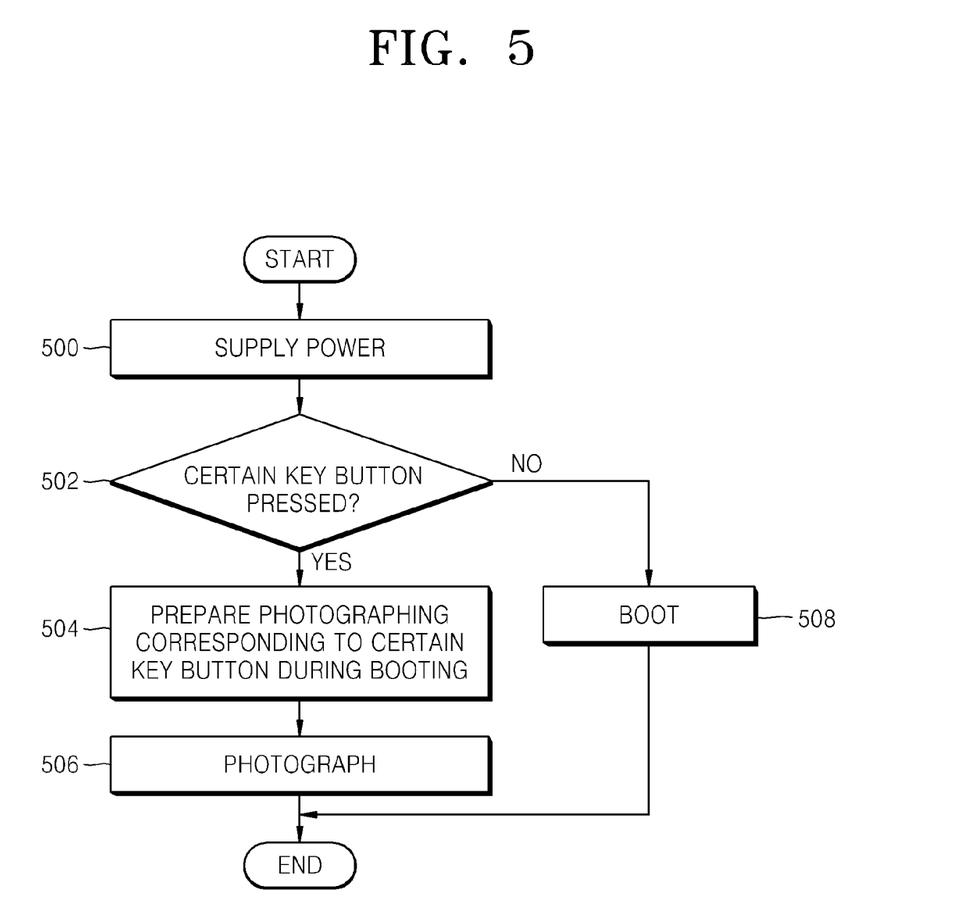
FIG. 5 is a flowchart illustrating a photographing control method for capturing a moment, according to an embodiment of the present invention.

FIG. 5 is a flowchart illustrating a photographing control method for capturing a moment, according to an embodiment of the present invention.

Referring to FIG. 5, power is supplied to a digital photographing apparatus as a user presses a power supply button in operation 500. It is determined whether a certain key button is pressed in operation 502. Here, the certain key button is a key for capturing a moment that is pre-set by a user or a manufacturer. When it is determined that the certain key button is pressed in operation 502, the digital photographing apparatus is booted and photographing corresponding to the certain key button is prepared in operation 504. Here, the photographing includes static image capturing and moving image capturing. In operation 506, after the preparing of the photographing is completed, a subject is automatically photographed without an input of the user, for example, without an SH1 or SH2 input. Here, SH1 input is an input when the user half-presses a shutter and SH2 input is an input when the user fully presses the shutter. Otherwise, when it is determined that the certain key button is not pressed in operation 502, the power is supplied according to the power supply button so as to boot the digital photographing apparatus.

Figure 6:
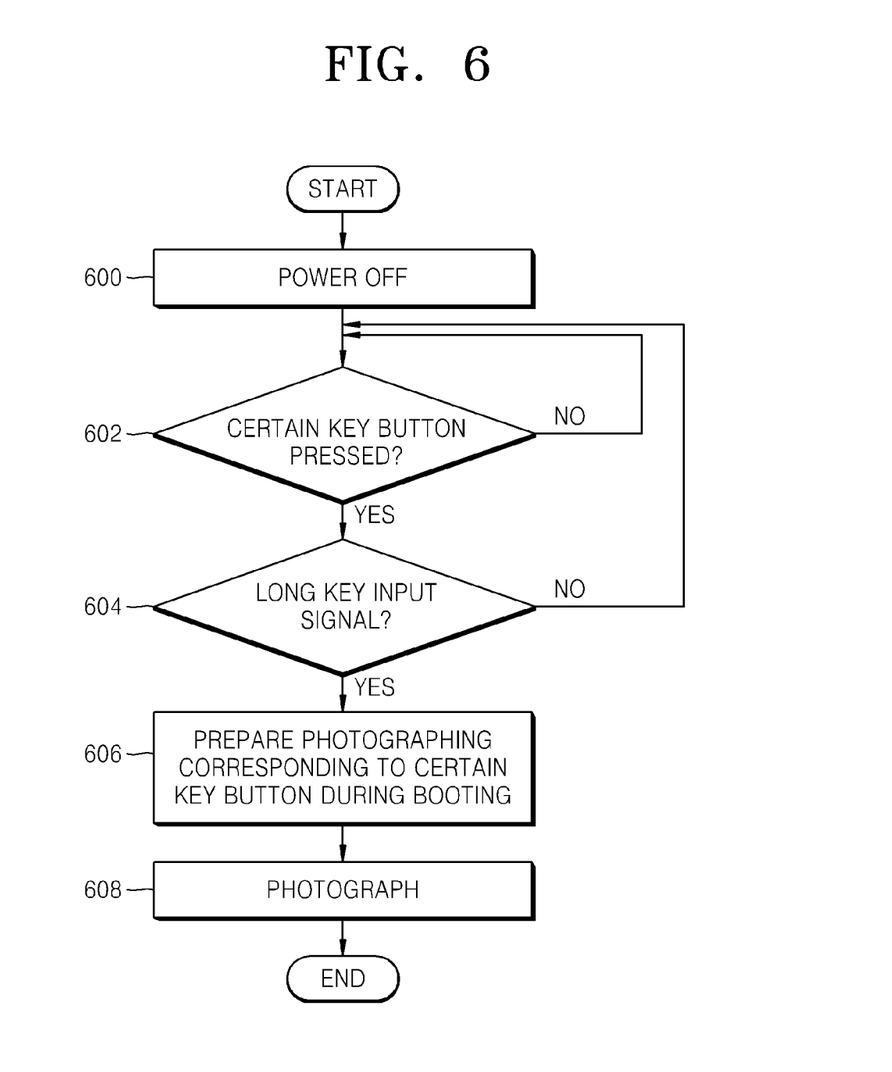
FIG. 6 is a flowchart illustrating a photographing control method for capturing a moment, according to another embodiment of the present invention.

FIG. 6 is a flowchart illustrating a photographing control method for capturing a moment, according to another embodiment of the present invention.

Referring to FIG. 6, a digital photographing apparatus is turned off in operation 600. In operation 602, it is determined whether a certain key button is pressed. Here, the certain key button is a key for capturing a moment that is pre-set by a user or a manufacturer. When the certain key button is pressed, it is determined whether an input signal of the certain key button is a long key input signal in operation 604. A standard for determining the long key input signal is pre-set by the user or the manufacturer. The long key input signal may be determined based on whether the input signal continues for a predetermined time.

When the input signal is the long key input signal, the digital photographing apparatus is turned on and simultaneously booted, and photographing corresponding to the certain key button is prepared in operation 606. In operation 608, after the preparing of the photographing is completed, a subject is automatically photographed without an input of the user, for example, without an SH1 or SH2 input.

Figure 7:
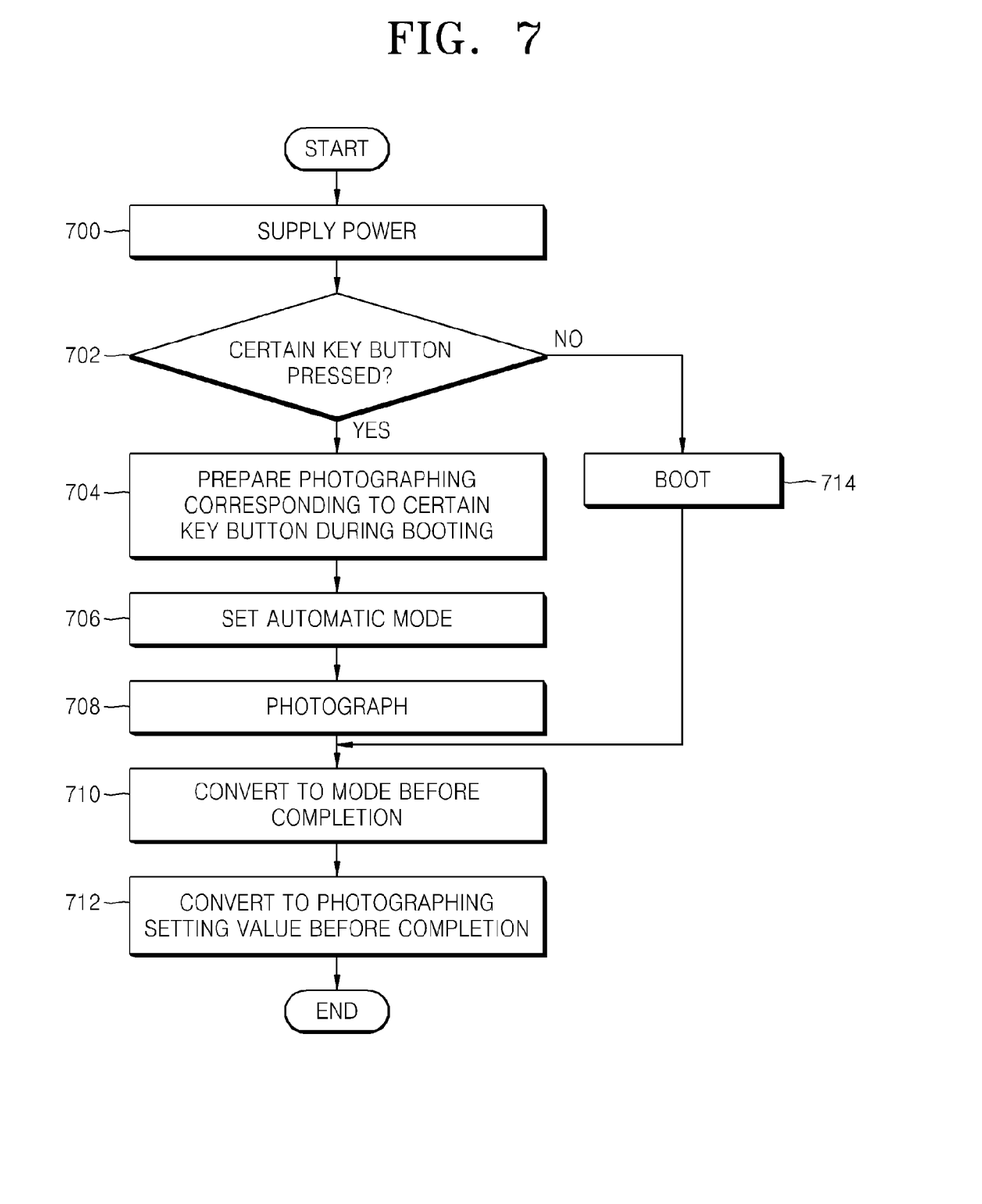
FIG. 7 is a flowchart illustrating a photographing control method for capturing a moment, according to another embodiment of the present invention.

FIG. 7 is a flowchart illustrating a photographing control method for capturing a moment, according to another embodiment of the present invention.

Referring to FIG. 7, power is supplied to a digital photographing apparatus when a user presses a power supply button in operation 700, and it is determined whether a certain key button is also pressed in operation 702. When it is determined that the certain key button is pressed in operation 702, the digital photographing apparatus is booted and prepares for photographing corresponding to the certain key button in operation 704. Here, the photographing includes static image capturing and moving image capturing, and is arbitrarily set according to different certain key buttons. In operation 706, the digital photographing apparatus is set to an automatic mode regardless of a mode before completion, for example, even when the digital photographing apparatus has completed photographing in a reproduction mode or a night view mode. In operation 708, a subject is photographed in the automatic mode. In operation 710, the digital photographing apparatus is converted to the mode before completion, for example, when the mode before completion is a reproduction mode, the digital photographing apparatus is converted to the reproduction mode. In operation 712, the digital photographing apparatus is set to a photographing setting value before completion.

Otherwise, when it is determined that the certain key button is not pressed in operation 702, the digital photographing apparatus is booted in operation 714, and set to the mode before completion and the photographing setting value before completion respectively in operations 710 and 712.

According to the photographing control method for capturing a moment, booting and capturing are simultaneously performed by combining use of the power supply button and the certain key button.

Also, the booting and capturing are simultaneously performed when the certain key button is pressed for a predetermined time, without pressing the power supply button.

In the embodiments described above, a digital camera is mainly discussed as an example of a digital photographing apparatus for applying the present invention, but the digital photographing apparatus is not limited thereto. It will be easily understood by one of ordinary skill in the art that the present invention may be applied to a camera phone, personal digital assistant (PDA), or a portable multimedia player (PMP) having a camera function. The invention can also be embodied as computer readable codes on a computer readable recording medium. The computer readable recording medium is any data storage device that can store data which can be thereafter read by a computer system, stored in a memory, and executed by a processor.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A photographing control method for capturing a moment by using a certain key button of a digital photographing apparatus, the photographing control method comprising:
    detecting a power-on signal of the digital photographing apparatus and an input signal of the certain key button;
    when the input signal is detected, booting the digital photographing apparatus according to the power-on signal;
    preparing photographing corresponding to the certain key button while booting the digital photographing apparatus;
    wherein in the preparing of photographing, the method further comprises setting a photographing mode of the digital photographing apparatus in an automatic mode;
    the method further comprising:
    controlling the digital photographing apparatus to capture a photograph of a predetermined subject and store the photograph as an image file in a data storage unit without a further input signal;
    photographing the predetermined subject in the automatic mode according to the controlling of the digital photographing apparatus;
    controlling the digital photographing apparatus to convert to a different mode that existed in the photographing apparatus before completion of a prior photographing operation after photographing the predetermined subject in the automatic mode; and
    controlling the digital photographing apparatus to set to a photographing setting value before completion of a prior photographing operation after converting to the different mode.

2. The photographing control method of claim 1, wherein the photographing corresponding to the certain key button comprises capturing a static image or a moving image.

3. The photographing control method of claim 1, wherein controlling the digital photographing apparatus to capture the photograph is performed simultaneously with booting the digital photographing apparatus according to the power-on signal.

4. A non-transitory computer readable recording medium having recorded thereon a program for executing a photographing control method for capturing a moment by using a certain key button of a digital photographing apparatus, the photographing control method comprising:
    detecting a power-on signal of the digital photographing apparatus and an input signal of the certain key button;
    when the input signal is detected, booting the digital photographing apparatus according to the power-on signal;
    preparing photographing corresponding to the certain key while booting the digital photographing apparatus;
    wherein in the preparing of photographing, the method further comprises setting a photographing mode of the digital photographing apparatus in an automatic mode;
    the method further comprising:
    controlling the digital photographing apparatus to capture a photograph of a predetermined subject and store the photograph as an image file in a data storage unit without a further input signal;
    photographing the predetermined subject in the automatic mode according to the controlling of the digital photographing apparatus;
    controlling the digital photographing apparatus to convert to a different mode that existed in the photographing apparatus before completion of a prior photographing operation after photographing the predetermined subject in the automatic mode; and
    controlling the digital photographing apparatus to set to a photographing setting value before completion of a prior photographing operation after converting to the different mode.

5. A photographing control apparatus for capturing a moment using a certain key button of a digital photographing apparatus, the photographing control apparatus comprising:
    a controller comprising:
        a detector that detects a power-on signal of the digital photographing apparatus and an input signal of the certain key button; and
        algorithms that:
            boot the digital photographing apparatus according to the power-on signal when the input signal is detected,
            prepare for photographing corresponding to the certain key button while booting the digital photographing apparatus, and
            control the digital photographing apparatus to capture a photograph of a predetermined subject and store the photograph as an image file in a data storage unit without a further input signal
    wherein the controller sets a photographing mode of the digital photographing apparatus to an automatic mode;
    the photographing control apparatus further comprising:
        a mode storage unit which stores a mode before completion of the digital photographing apparatus; and
        a setting value storage unit which stores a photographing setting value before completion of the digital photographing apparatus;
    wherein the controller controls the digital photographing apparatus to convert to the mode that existed in the digital photographing apparatus before completion of a prior photographing operation stored in the mode storage unit after photographing the predetermined subject in the automatic mode, and sets the digital photographing apparatus to the photographing setting value stored in the setting value storage unit after converting to the mode that existed in the digital photographing apparatus before completion of the prior photographing operation.

6. The photographing control apparatus of claim 5, wherein the photographing corresponding to the certain key button comprises capturing a static image or a moving image.

7. The photographing control apparatus of claim 5, wherein the controller controls the digital photographing apparatus to capture the photograph simultaneously with booting the digital photographing apparatus according to the power-on signal.

* * * * *